United States Patent
Kim et al.

(10) Patent No.: US 7,796,621 B2
(45) Date of Patent: Sep. 14, 2010

(54) APPARATUS FOR MATCHING GIGABIT ETHERNET (GBE) SIGNALS WITH OPTICAL TRANSPORT HIERARCHY (OTH)

(75) Inventors: Seung Hwan Kim, Daejeon (KR); Je Soo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 127 days.

(21) Appl. No.: 12/184,468

(22) Filed: Aug. 1, 2008

(65) Prior Publication Data
US 2009/0154479 A1    Jun. 18, 2009

(30) Foreign Application Priority Data
Dec. 18, 2007    (KR) .................. 10-2007-0133739

(51) Int. Cl.
| | |
|---|---|
| H04W 4/00 | (2009.01) |
| H04L 12/28 | (2006.01) |
| H04L 12/56 | (2006.01) |
| H04J 3/04 | (2006.01) |

(52) U.S. Cl. .................. 370/401; 370/314; 370/535; 370/537

(58) Field of Classification Search .............. 370/401, 370/314, 535, 537
See application file for complete search history.

(56) References Cited

U.S. PATENT DOCUMENTS

| | | | | |
|---|---|---|---|---|
| 6,108,306 | A | * | 8/2000 | Kalkunte et al. ............ 370/235 |
| 2004/0090995 | A1 | * | 5/2004 | Kang et al. ................. 370/535 |
| 2004/0202198 | A1 | | 10/2004 | Walker et al. |
| 2007/0076769 | A1 | | 4/2007 | Zou |
| 2008/0159277 | A1 | * | 7/2008 | Vobbilisetty et al. ........ 370/357 |
| 2008/0181608 | A1 | * | 7/2008 | Parker et al. .................. 398/52 |

FOREIGN PATENT DOCUMENTS

KR    10-0537904    12/2005

OTHER PUBLICATIONS

Korean Office Action for Application No. 9-5-2009-040106411, dated Sep. 28, 2009.

* cited by examiner

*Primary Examiner*—Ronald Abelson
(74) *Attorney, Agent, or Firm*—Lahive & Cockfield, LLP; EuiHoon Lee, Esq.

(57) ABSTRACT

Provided is an apparatus for matching Gigabit Ethernet (GbE) signals to an Optical Transport Hierarchy (OTH). The apparatus real-time records a source address and input port information of GbE Ethernet frames in a memory, compares a destination address of the Ethernet frame which is a payload of a GFP frame with memory table information, searches an output port location of the GbE, and interreceives GbE frames and Generic Frame Procedure (GFP) frames by multiplexing/demultiplexing.

13 Claims, 6 Drawing Sheets

FIG. 3

| Word \ Bit | 53 52 51 50 49 48 47 ... | 5 4 3 2 1 0 |
|---|---|---|
| 0 | MAC(47:0) | Port(5:0) |
| 1 | MAC(47:0) | Port(5:0) |
| 2 | MAC(47:0) | Port(5:0) |
| 3 | MAC(47:0) | Port(5:0) |
| 4 | MAC(47:0) | Port(5:0) |
| 5 | MAC(47:0) | Port(5:0) |
| ⋮ | ⋮ | |
| 2046 | MAC(47:0) | Port(5:0) |
| 2047 | MAC(47:0) | Port(5:0) |

APPARATUS FOR MATCHING GIGABIT ETHERNET (GBE) SIGNALS WITH OPTICAL TRANSPORT HIERARCHY (OTH)

CROSS-REFERENCE TO RELATED PATENT APPLICATION

This application claims the benefit of Korean Patent Application No. 10-2007-0133739, filed on Dec. 18, 2007, in the Korean Intellectual Property Office, the disclosure of which is incorporated herein in its entirety by reference.

BACKGROUND OF THE INVENTION

1. Field of the Invention

The present invention relates to an apparatus for matching Gigabit Ethernet (GbE) frames with an Optical Transport Hierarchy (OTH) which is a standard digital transport hierarchy defined in ITU-T recommendation G.709.

This work was supported by the IT R&D program of MIC/ IITA. [2006-S-060-02, OTH-based 40G Multi-service Transmission Technology]

2. Description of the Related Art

A technology of mapping 1 gigabit Ethernet signals with encapsulated payloads by defining an Optical Channel Data Unit0 (ODU0) having about 1.22 Gbit/s capacity has been suggested in order to match 1 gigabit Ethernet signals with an Optical Transport Hierarchy (OTH) defined in ITU-T recommendation G.709. According to this technology, a single GFP-T is mapped into an ODU0, two ODU0s are mapped into a single ODU1, eight ODU0s are mapped into a single ODU2, or thirty two ODU0s are mapped into a single ODU3.

An Ethernet bridge interconnects two or more local area networks (LANs). A port of the bridge may be interconnected to another bridge or directly interconnected to a terminal or a router. Since the bridge processes a data link layer(Layer 2), the bridge regards a router which processes a network layer (Layer 3) as a terminal. In addition, a port of the bridge may be interconnected with a peer to peer link or a universal bus LAN. When an Ethernet frame is transported, a medium access control (MAC) destination address (DA) is placed in a front portion of the frame and a MAC source address (SA) is placed next to the DA.

A fundamental function of the bridge is to hand over a received frame to a port to which a destination address is assigned. Whenever a frame is input to a port, the bridge learns a MAC SA of the frame by recording that the SA is assigned to the port in a filtering data base (FDB) table. In addition, the bridge looks up an FDB table entry corresponding to a DA of the frame and sends the frame to a port to which the DA is assigned. The DA information is learned when a frame having the address as an SA is input. If a frame having a DA which is not learned is input, the frame is sent to all other ports except the port to which the frame having the DA is input to perform communication. If a DA is assigned to the port through which a frame is input, the frame is discarded since it is regarded that the frame is already transported to the destination. Thus, terminals or routers interconnected with each other via bridges can communicate with each other using MAC addresses even though they do not know each other's physical locations. If a DA type is broadcasting in a LAN, frames are broadcast to all segments. If a bridge does not know a DA, it floods frames.

However, since limited GbE signals match with each of the ODU1, ODU2, and ODU3 when GbE signals match with the OTH system according to the conventional technology, signal transportation may be limited and bandwidth loss may occur.

SUMMARY OF THE INVENTION

The present invention provides an apparatus for matching Gigabit Ethernet (GbE) signals with an Optical Transport Hierarchy (OTH) by mapping a plurality of GbE signals into a Generic Frame Procedure (GFP) format, and mapping the GFP format into an Optical channel Data Unit (ODU) layers using a Filtering Data Base (FDB) processing device. Thus, the apparatus can be efficiently used without bandwidth loss compared to a conventional apparatus.

According to an aspect of the present invention, there is provided an apparatus for matching GbE signals with an OTH, the apparatus including: a plurality of Gigabit Media Independent Interface (GMII) receiving units which respectively check errors in each of a plurality of GbE signals; a plurality of frame buffer units which outputs each of the Ethernet frames of signals outputted from the GMII receiving units; an address learning and multiplexing unit which controls recording a source address and port information included in each of the Ethernet frames outputted from the frame buffer unit and multiplexes and outputs the Ethernet frames; a memory recording the source address and port information; a GFP sending and matching unit which matches the multiplexed Ethernet frames outputted from the address learning and multiplexing unit with a GFP-F frame format; and an ODU sending and matching unit which outputs GFP-F frames outputted from the GFP sending and matching unit to OTH network.

According to another aspect of the present invention, there is provided an apparatus for matching GbE signals to OTH, the apparatus including: a memory recording a source address and port information of each of Ethernet frames; an ODU receiving and matching unit which receives signals from OTH network; a GFP receiving and matching unit which matches GFP-F frames outputted from the ODU receiving and matching unit with the Ethernet frames; an address lookup and demultiplexing unit which compares a destination address of the Ethernet frame with the source address recorded in the memory, and outputs demultiplexed Ethernet frames in response to the port information; and a plurality GMII sending unit which converts each of the Ethernet frames outputted from the address lookup and demultiplexing unit to a GMII format and outputs the GMII data.

BRIEF DESCRIPTION OF THE DRAWINGS

The above and other features and advantages of the present invention will become more apparent by describing in detail exemplary embodiments thereof with reference to the attached drawings in which:

FIG. 3 illustrates a structure of a filtering data base (FDB) table of a memory;

DETAILED DESCRIPTION OF THE INVENTION

An apparatus for matching Gigabit Ethernet (GbE) signals with an Optical Transport Hierarchy (OTH) according to the present invention will now be described more fully with reference to the accompanying drawings, in which exemplary embodiments of the invention are shown.

Figure 1:
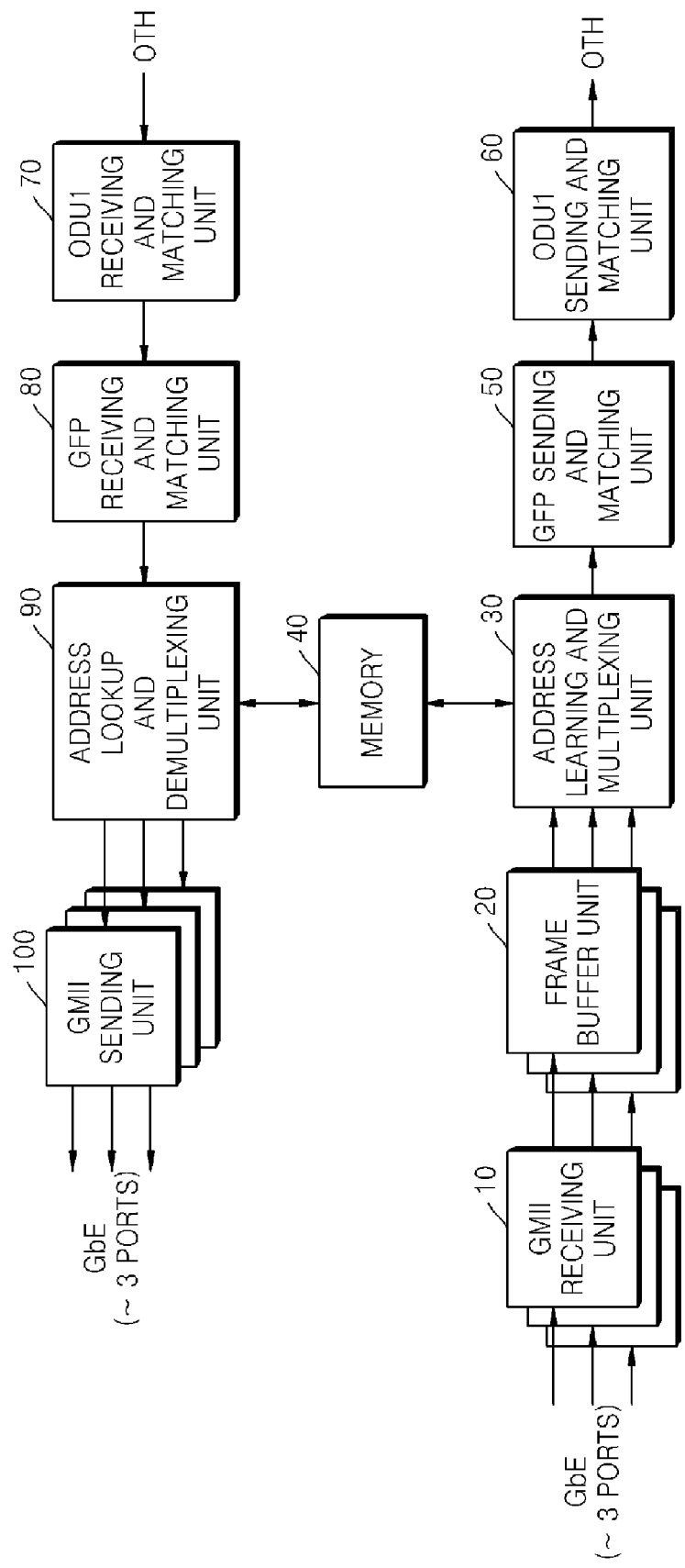
FIG. 1 is a block diagram illustrating an apparatus for matching gigabit Ethernet (GbE) signals with an Optical Transport Hierarchy (OTH) according to an embodiment of the present invention.

FIG. 1 is a block diagram illustrating an apparatus for matching GbE signals with an OTH according to an embodiment of the present invention. The apparatus of FIG. 1 is an apparatus for matching 1 GbE signals with an OTH defined in ITU-T recommendation G.709 and processing 2.5 giga rate Optical Channel Data Unit 1 (ODU1) signals for receiving the 1 GbE signals.

A single ODU1 signal can be matched with a maximum of 3 GbE signals in the apparatus in which the GbE signals interface with an ODU1 device which is a lower layer of the OTH system shown in FIG. 1.

Data received by a Gigabit Media Independent Interface (GMII) receiving unit 10 is 8-bit GMII type transported from the physical (PHY) layer or a Multi-Gigabit Transceiver (MGT). The GMII receiving unit 10 performs a Cyclic Redundancy Check (CRC) on the data and outputs data that passed the CRC to a frame buffer unit 20. If the data fails the CRC test, sending data is stopped. The data that passed the CRC test is converted from an 8-bit/125 MHz format to a 32-bit/31.25 MHz format in order to be processed in a filtering data base (FDB) which receives a maximum of three GMIIs. An RX_FIFO (First In First Out) control block (not shown) in the GMII receiving unit 10 determines sending of the data based on the CRC results, removes preamble data, and sends signals including monitored information, such as the number of sent data frames and the byte size, to a CPU interface block. The apparatus may include a maximum of three GMII receiving units 10.

The frame buffer unit 20 stores input frames, provides frame length information if there is more than one frame, and requests an address learning and multiplexing unit 30 to process the frames. The apparatus may include a maximum of three frame buffer units 20.

Figure 2:
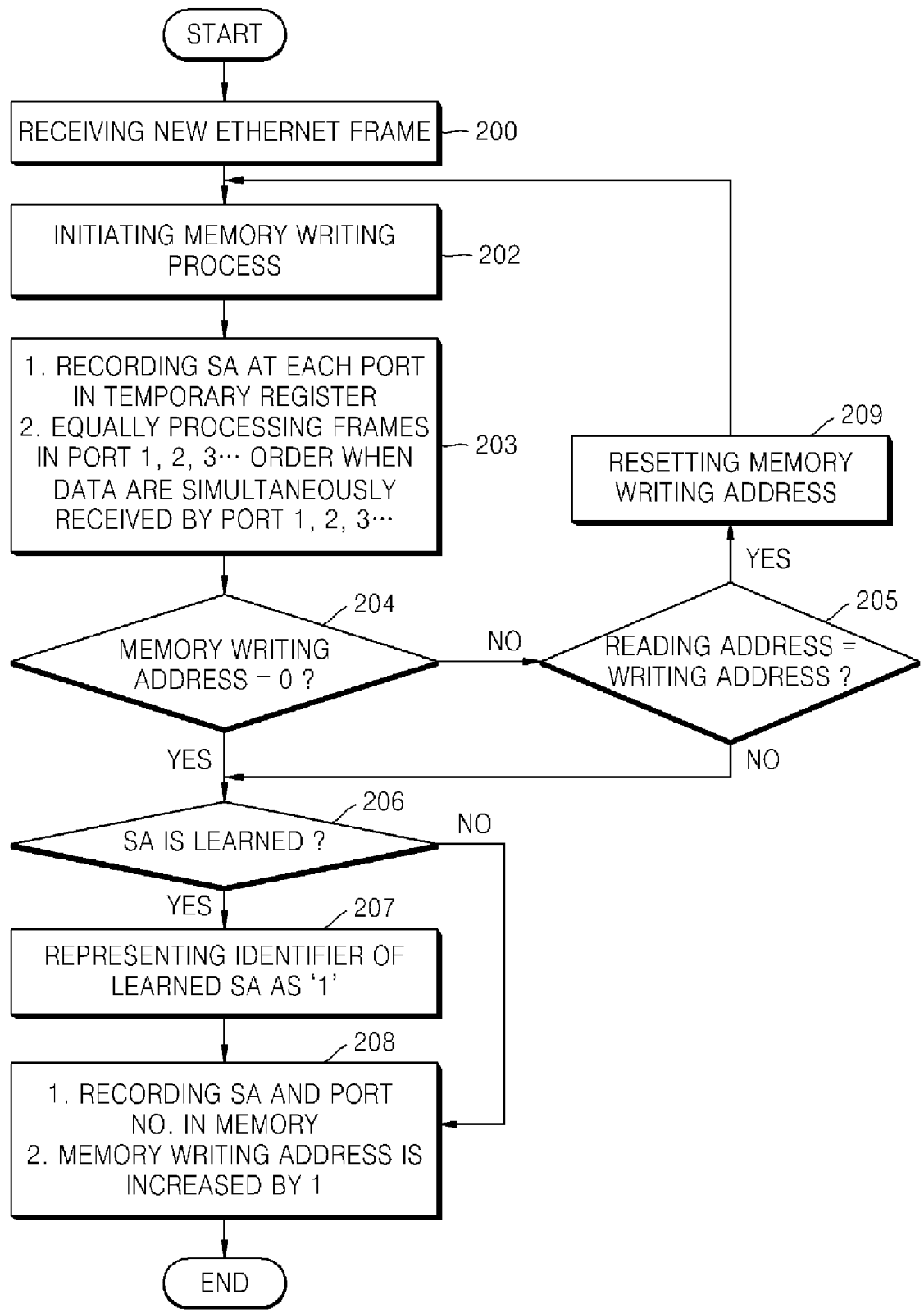
FIG. 2 is a flowchart illustrating a process of writing a source address (SA) and port information in a memory performed by an address learning and multiplexing unit.

The address learning and multiplexing unit 30 sends signals allowing a subsequent frame to be input to the frame buffer unit 20 in response to the request by the frame buffer unit 20 if previous frames are sent by storing the previous frames in a delayed frame buffer for output. If a new frame is input, a source address (SA) and a port number are recorded in a memory through a memory writing process illustrated in FIG. 2, the input frames are multiplexed according to the input order as shown in the flowchart of FIG. 2, and then the multiplexed frames are sent to a Generic Frame Procedure (GFP) sending and matching unit 50. Here, since the address learning and multiplexing unit 30 processes a maximum of 2.5 G data frame, a clock of the address learning and multiplexing unit 30 needs to be matched with a clock that is a maximum of 2.5 times (78.125 MHz) as large as the internal standard clock (31.25 MHz). The 2.5 times increased clock is used as a clock for a GFP sending and matching unit 50.

FIG. 2 is a flowchart illustrating a process of writing a source address and port information in a memory performed by the address learning and multiplexing unit.

When a frame buffer unit 20 receives a new Ethernet frame (200), a memory writing process is initiated (202). An SA of the Ethernet frame input at each port is recorded in a temporary register. If a plurality of ports simultaneously receive data, priority is equally given to the ports (203). It is determined whether the memory writing address is 0 (204). If the memory writing address is not 0, the reading address and the writing address are compared (205). If the two addresses are the same, the memory writing address is reset (209) so as to be ready for the subsequent memory writing process (202) since the memory size is limited. If the memory writing address is 0, it is identified whether an SA is already learned by reading the memory 40 (206). If the SA is learned, it is already recorded in the memory 40. If the SA is learned, an identifier is represented by 1 (207). The SA and port information are input in the memory 40 regardless of whether the SA is learned, and the memory writing address is increased by 1 (208).

The memory 40 stores the SA and port information according to the control of the address learning and multiplexing unit 30. Here, the memory 40 may be an FDB memory.

FIG. 3 illustrates a structure of a FDB table of a memory 40. The FDB table is 54-bit data. 6 bits describes information of a GbE port, which is input to the apparatus of the present invention, and the other 48 bits describe an SA input via a GbE interface. Since the Medium Access Control (MAC) address is 48 bits, the SA field may have 2048 values. Accordingly, a plurality of MAC addresses are required to share a small storage area in order to perform a learning and lookup process using a limited memory. If there are 4K entries, a 12-bit entry address is obtained using the 48-bit MAC address. The entry address may be easily obtained by dividing the MAC address using a CRC32 equation and taking lower 11 bits. According to the present invention, the obtained entry address and an associated address located in an offset may be simultaneously used in order to efficiently use table resources. This is possible by simultaneously lookup the associated addresses when lookup or learning is performed. That is, when learning is performed while simultaneously reading an address obtained by a Hash function and its associated address, if the information is not written, information on the MAC address is written in an empty field there between. When a lookup is performed, information of the MAC address is selected while simultaneously lookup the address obtained by the Hash function and its associated address. By the above processes, the probability of a learning or lookup failure due to there being not enough space in the table may be reduced. The Hash function is included respectively in the address learning and multiplexing unit 30 and an address lookup and demultiplexing unit 90.

An input of the GFP sending and matching unit 50 has a structure matching with an Ethernet frame according to ITU-T recommendation G. 7041, and the frame is processed by a GFP-F format. An output of the GFP sending and matching unit 50 has a structure mapping the frames into an ODU1 according to ITU-T recommendation G. 709. The internal data and clock system of the GFP sending and matching unit 50 are adjusted to those of an output clock system of the address learning and multiplexing unit 30.

An input of an ODU1 sending and matching unit 60 receives a GFP-F frame and an output of the ODU1 sending and matching unit 60 is matched with an OTH network which is currently at a 40G level. Detailed frame formats are adjusted based on ITU-T recommendation G.709. The input has an elastic buffer to convert a clock system of the GFP sending and matching unit 50 with an OTH clock system.

An input of an ODU1 receiving and matching unit 70 is matched with the OTH network which is currently at a 40G level, and an output of the ODU1 receiving and matching unit 70 is matched with the GFP-F frame. Detailed frame formats are adjusted based on ITU-T recommendation G.709. The output has an elastic buffer to convert a clock system of a GFP receiving and matching unit 80 with the OTH clock system.

An output of the GFP receiving and matching unit 80 has a structure matching with an Ethernet frame according to ITU-T recommendation G. 7041, and the frame is processed by a GFP-F format. An input of the GFP receiving and matching unit 80 has a structure matching with an ODU1 according to ITU-T recommendation G. 709. The internal data and clock system of the GFP receiving and matching unit 80 are adjusted to those of an input clock system of an address lookup and demultiplexing unit 90.

The address lookup and demultiplexing unit 90 converts a new input GFP-F frame to an Ethernet frame format. Then, the address lookup and demultiplexing unit 90 reads a DA through an FDB memory reading process of FIG. 4 and identifies whether there is an address which is identical to the DA. If so, the address lookup and demultiplexing unit 90 identifies port information recorded with the SA in the memory and outputs the input Ethernet frame to a GMII sending unit 100. Here, the internal data and clock system of the address lookup and demultiplexing unit 90 are adjusted to those of a system defined in the address learning and multiplexing unit 30.

Figure 4:
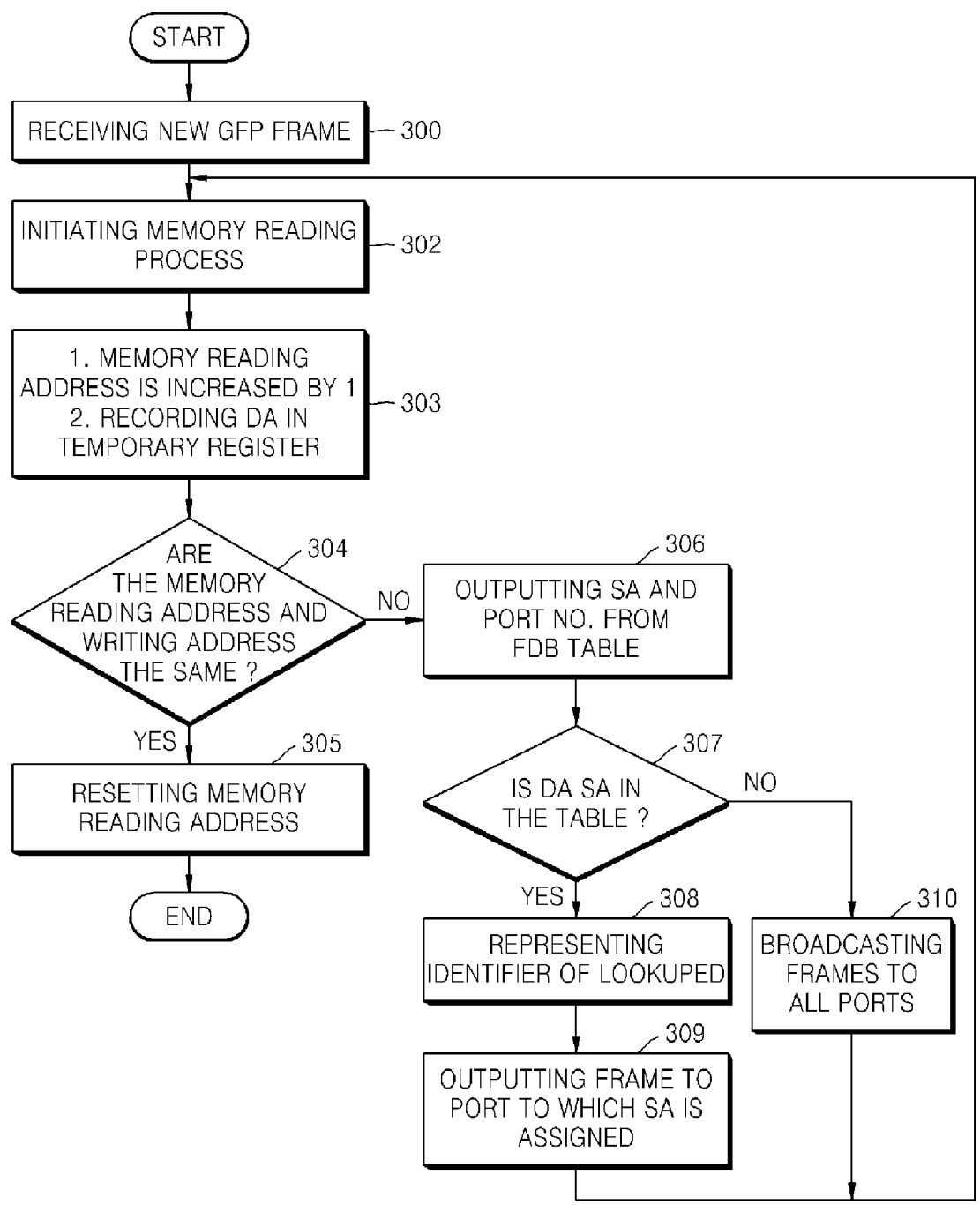
FIG. 4 is a flowchart illustrating a memory reading process by an address lookup and demultiplexing unit.

FIG. 4 is a flowchart illustrating a memory reading process performed by an address lookup and demultiplexing unit. When a new GFP frame is received (300), the frame is converted into an Ethernet frame and a memory reading process is performed (302). The memory reading address is increased by 1, a DA is stored in a temporary register (303), and it is identified whether a memory reading address and a memory writing address are the same (304). If the two addresses are the same, the memory reading address is reset (305). If the two addresses are different, an SA and port information are output from the FDB table (306) and it is identified whether the DA is the same as the SA of the table (307). If the addresses are the same, an identifier is represented by 1 (308). The frame is output to the port to which the SA is assigned (309). If the DA is different from the SA of the table, the frame is broadcast (310), and the step proceeds to the memory reading process (302).

Data output from a GMII sending unit 100 is an 8-bit GMII type which can interface with the PHY layer or an MGT. Since the data is input from the address lookup and demultiplexing unit 90 in the format of 32 bits/31.25 MHz, signals including monitored information, such as the number of received data frames and the byte, are sent to a CPU interface block, and converted to an 8 bits/125 MHz format. Then, a preamble is added thereto in order to send the frame, and a GMII format frame is output.

Figure 5:
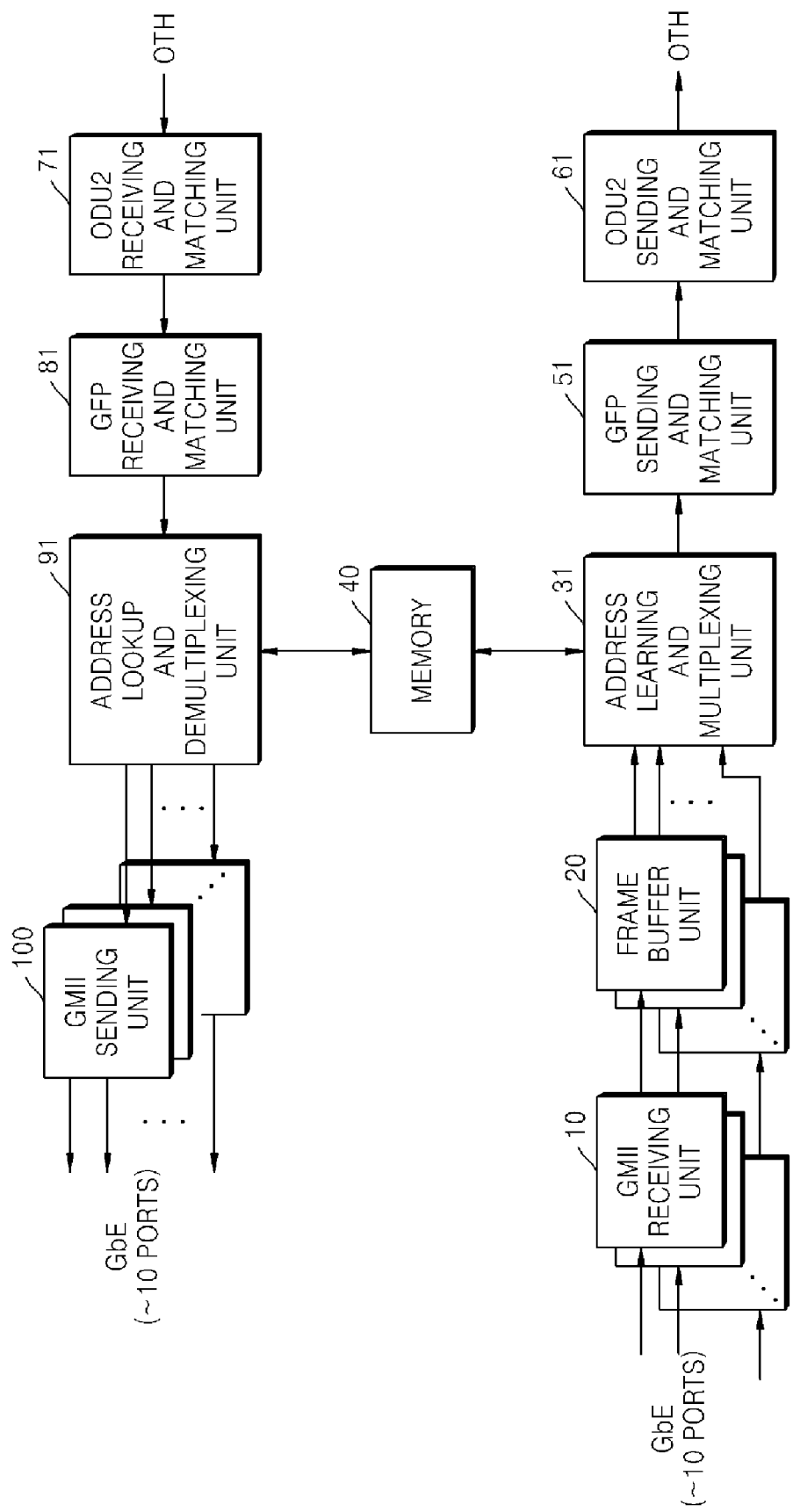
FIG. 5 is a block diagram illustrating an apparatus for matching gigabit Ethernet (GbE) signals with an OTH according to another embodiment of the present invention.

FIG. 5 is a block diagram illustrating an apparatus for matching GbE signals to an OTH according to another embodiment of the present invention. The apparatus of FIG. 5 is an apparatus processing 10 giga rate ODU2 for receiving GbE signals.

A single ODU2 signal can be matched with a maximum of ten GbE signals in the apparatus in which the GbE signals interface with an ODU2 device which is a lower layer of the OTH system shown in FIG. 5.

Data received by a GMII receiving unit 10 is an 8-bit GMII type transported from the PHY layer or an MGT. The GMII receiving unit 10 performs a CRC on the data and outputs data that passed the CRC to an FDB processing block. If the data fails the CRC test, sending data is stopped by a receiving FIFO block. The data that passed the CRC test is converted from an 8-bits/125 MHz format to a 32-bits/31.25 MHz format or a 64-bits/12.625 MHz format in order to be processed in an FDB which receives a maximum of 10 GMIIs. An RX_FIFO control block determines sending of the data based on the CRC results, removes preamble data, and sends signals including monitored information, such as the number of sent data frames and the byte, to a CPU interface block.

The frame buffer unit 20 stores input frames, provides frame length information if there is more than one frame, and requests an address learning and multiplexing unit 31 to process the frames.

The address learning and multiplexing unit 31 sends signals allowing a subsequent frame input to the frame buffer unit 20 in response to the request of the frame buffer unit 20 if previous frames are sent by storing the previous frames in a delayed frame buffer for output. If a new frame is input, an SA and a port number are recorded in a memory 40 through a memory writing process illustrated in FIG. 2, the input frames are multiplexed according to the input order as shown in the flowchart of FIG. 2, and then the multiplexed frames are sent to a Generic Frame Procedure (GFP) sending and matching unit 51. Here, since the address learning and multiplexing unit 31 processes a maximum 10G data frame, a clock of the address learning and multiplexing unit 31 needs to match a clock that is a maximum of 10 times (312.5 MHz/126.25 MHz) as large as the internal standard clock (31.25 MHz/12.625 MHz). The 10 times increased clock is used as a clock for a GFP sending and matching unit 51.

An input of the GFP sending and matching unit 51 has a structure matching with an Ethernet frame according to ITU-T recommendation G. 7041, and the frame is processed by a GFP-F format. An output of the GFP sending and matching unit 51 has a structure mapping the frames into an ODU2 according to ITU-T recommendation G.709. The internal data and clock system of the GFP sending and matching unit 51 are adjusted to those of an output clock system of the address learning and multiplexing unit 31.

An input of an ODU2 sending and matching unit 61 receives a GFP-F frame and an output of the ODU2 sending and matching unit 61 is matched with an OTH network which is currently at a 40G level. Detailed frame formats are adjusted based on ITU-T recommendation G.709. The input has an elastic buffer to convert a clock system of the GFP sending and matching unit 51 to an OTH clock system.

An input of an ODU2 receiving and matching unit 71 is matched with the OTH network which is currently at a 40G level, and an output of the ODU2 receiving and matching unit 71 is matched with the GFP-F frame. Detailed frame formats are adjusted based on ITU-T recommendation G.709. The output has an elastic buffer to convert a clock system of a GFP receiving and matching unit 81 to the OTH clock system.

An output of the GFP receiving and matching unit 81 has a structure matching with an Ethernet frame according to ITU-T recommendation G. 7041, and the frame is processed by a GFP-F format. An input of the GFP receiving and matching unit 81 has a structure mapping the frames into an ODU2 according to ITU-T recommendation G. 709. The internal data and clock system of the GFP receiving and matching unit 81 are adjusted to those of an input clock system of an address lookup and demultiplexing unit 91.

The address lookup and demultiplexing unit 91 converts a new input GFP-F frame to an Ethernet frame format. Then, the address lookup and demultiplexing unit 91 reads a DA through a FDB memory reading process of FIG. 4 and identifies whether there is an address which is the same as the DA. If so, the address lookup and demultiplexing unit 91 identifies port information recorded with the SA in the memory and outputs the Ethernet frame inputted via the port to a GMII sending unit 100. Here, the internal data and clock system of the address lookup and demultiplexing unit 91 are adjusted to those of a system defined in the address learning and multiplexing unit 31.

Data output from the GMII sending unit 100 is an 8-bit GMII type which can interface with the PHY layer or an MGT. Since the data is input from the address lookup and demultiplexing unit 82 in the format of 32 bits/31.25 MHz, signals including monitored information, such as the number of received data frames and the byte size, are sent to a CPU interface block, and converted to an 8 bits/125 MHz format. Then, a preamble is added thereto in order to send the frame, and a GMII format frame is output.

Figure 6:
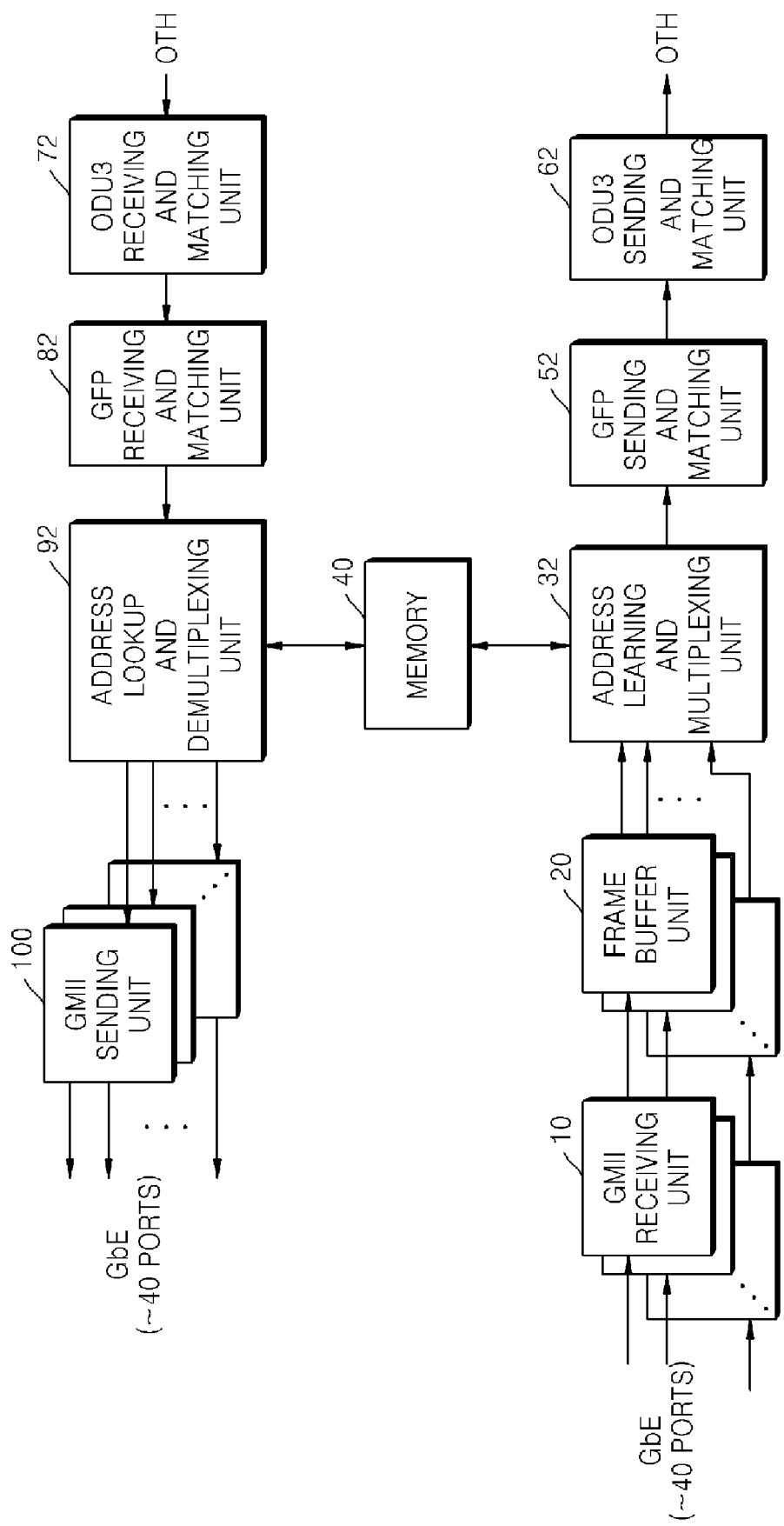
FIG. 6 is a block diagram illustrating an apparatus for matching GbE signals with an OTH according to another embodiment of the present invention.

FIG. 6 is a block diagram illustrating an apparatus for matching GbE signals to an OTH according to another embodiment of the present invention. The apparatus of FIG. 6 is an apparatus processing 40 giga rate ODU3 for receiving GbE signals.

A single ODU3 signal can be matched with a maximum of 40 GbE signals in the apparatus in which the GbE signals interface with an ODU3 device which is a lower layer of the OTH system shown in FIG. 6.

Data received by a GMII receiving unit 10 is an 8-bit GMII type transported from the PHY layer or an MGT. The GMII receiving unit 10 performs a CRC on the data and outputs data that passed the CRC to a FDB processing block. If the data fails the CRC test, sending data is stopped by a receiving FIFO block. The data that passed the CRC test is converted from an 8-bit/125 MHz format to a 64-bit/12.625 MHz format or a 128-bit/6.3125 MHz format in order to be processed in an FDB which receives a maximum of 40 GMIIs. An RX_FIFO control block determines sending of the data based on the CRC results, removes preamble data, and sends signals including monitored information, such as the number of sent data frames and the byte size, to a CPU interface block.

The frame buffer unit 20 stores input frames, provides frame length information if there is more than one frame, and requests an address learning and multiplexing unit 32 to process the frames.

The address learning and multiplexing unit 32 sends signals allowing a subsequent frame input to the frame buffer unit 20 in response to the request of the frame buffer unit 20 if previous frames are sent by storing the previous frames in a delayed frame buffer for output. If a new frame is input, an SA and a port number are recorded in a memory 40 through a memory writing process illustrated in FIG. 2, the input frames are multiplexed according to the input order as shown in the flowchart of FIG. 2, and then the multiplexed frames are sent to a Generic Frame Procedure (GFP) sending and matching unit 52. Here, since the address learning and multiplexing unit 32 processes a maximum 40 G data frame, a clock of the address learning and multiplexing unit 32 needs to match with a clock that is a maximum of 40 times (505 MHz/252.5 MHz) as large as the internal standard clock (12.625 MHz/6.3125 MHz). The 40 times increased clock is used as a clock for a GFP sending and matching unit 52.

An input of the GFP sending and matching unit 52 has a structure matching with an Ethernet frame according to ITU-T recommendation G. 7041, and the frame is processed by using a GFP-F format. An output of the GFP sending and matching unit 52 has a structure mapping the frames into an ODU3 according to ITU-T recommendation G.709. The internal data and clock system of the GFP sending and matching unit 52 are adjusted to those of the output clock system of the address learning and multiplexing unit 32.

An input of an ODU3 sending and matching unit 62 receives a GFP-F frame and an output of the ODU3 sending and matching unit 62 is matched with an OTH network which is currently at a 40G level. Detailed frame formats are adjusted based on ITU-T recommendation G.709. The input has an elastic buffer to convert a clock system of the GFP sending and matching unit 52 to the OTH clock system.

An input of an ODU3 receiving and matching unit 72 is matched with the OTH network which is currently at a 40G level, and an output of the ODU3 receiving and matching unit 72 is matched with the GFP-F frame. Detailed frame formats are adjusted based on ITU-T recommendation G.709. The output has an elastic buffer to convert a clock system of a GFP receiving and matching unit 82 to the OTH clock system.

An output of the GFP receiving and matching unit 82 has a structure matching with an Ethernet frame according to ITU-T recommendation G. 7041, and the frame is processed by using a GFP-F format. An input of the GFP receiving and matching unit 82 has a structure for mapping the frames into an ODU3 according to ITU-T recommendation G. 709. The internal data and clock system of the GFP receiving and matching unit 82 are adjusted to those of an input clock system of an address lookup and demultiplexing unit 92.

The address lookup and demultiplexing unit 92 converts a new input GFP-F frame to an Ethernet frame format. Then, the address lookup and demultiplexing unit 92 reads a DA by performing a FDB memory reading process as illustrated in FIG. 4 and identifies whether there is an address which is the same as the DA. If so, the address lookup and demultiplexing unit 92 identifies port information recorded with the SA in the memory and outputs the Ethernet frame input via the port to a GMII sending unit 100. Here, the internal data and clock system of the address lookup and demultiplexing unit 92 are adjusted to those of a system defined in the address learning and multiplexing unit 32.

Data output from the GMII sending unit 100 is an 8-bit GMII type which can interface with the PHY layer or an MGT. Since the data is input from the address lookup and demultiplexing unit 92 in the format of 32 bit/31.25 MHz, signals including monitored information, such as the number of received data frames and the byte size, are sent to a CPU interface block, and converted to 8 bit/125 MHz format. Then, a preamble is added thereto so as to send the frame, and a GMII format frame is output.

Meanwhile, the concept of the present invention may be embodied in a computer-readable code/instruction/program. For example, the concept of the present invention may be embodied in a universal digital computer operating the code/instruction/program using a computer-readable recording medium. The computer-readable recording medium includes a storage medium such as a magnetic storage medium such as a ROM, a floppy disk, a hard disk and a magnetic tape, an optical reading medium such as a CD-ROM and a DVD, and a carrier wave such as Internet. In addition, the concept of the present invention can be embodied in a medium (media) embedding computer-readable codes and processed in a plurality of computer systems interconnected via network. Programs, codes and code segments according to the present invention can be inferred by those of ordinary skill in the art.

According to the present invention, GbE signals are efficiently matched with an OTH system using an FDB processing device. In particular, a maximum of several tens of GbE signals can be matched respectively with ODU1, ODU2 and ODU3 which are lower layers of the OTH by applying the same apparatus. The system according to the present invention is efficient and economical without bandwidth loss compared to the conventional system.

While the apparatus for matching GbE signals with the OTH according to the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for matching Gigabit Ethernet (GbE) signals with an Optical Transport Hierarchy (OTH), the apparatus comprising:
   a plurality of Gigabit Media Independent Interface (GMII) receiving units which respectively check errors in each of a plurality of GbE signals;
   a plurality of frame buffer units which output Ethernet frames of signals output from the GMII receiving units;
   an address learning and multiplexing unit which controls recording of a source address and port information included in each of the Ethernet frames output from the frame buffer units and multiplexes and outputs the Ethernet frames;
   a memory recording the source address and port information;
   a Generic Frame Procedure (GFP) sending and matching unit which matches the multiplexed Ethernet frames output from the address learning and multiplexing unit with a GFP-F frame format; and
   an Optical Channel Data Unit (ODU) sending and matching unit which outputs GFP-F frames output from the GFP sending and matching unit to an OTH network.

2. The apparatus of claim 1, comprising three GMII receiving units and three frame buffer units wherein the ODU sending and matching unit corresponds to 2.5 giga rate ODU1 layer.

3. The apparatus of claim 1, comprising ten GMII receiving units and ten frame buffer units wherein the ODU sending and matching unit corresponds to 10 giga rate ODU2 layer.

4. The apparatus of claim 1, comprising forty GMII receiving units and forty frame buffer units wherein the ODU sending and matching unit corresponds to 40 giga rate ODU3 layer.

5. The apparatus of claim 1, wherein the memory is a Filtering Data Base (FDB) memory.

6. The apparatus of claim 1, wherein if the address learning and multiplexing unit simultaneously receives the Ethernet frames from a plurality of frame buffer units, the address learning and multiplexing unit gives equal priority to the frames in order to process the frames.

7. The apparatus of claim 5, the address learning and multiplexing unit identifies whether the source address is already learned by reading the FDB memory.

8. An apparatus for matching GbE signals to an OTH, comprising:
   a memory recording a source address and port information of each of Ethernet frames;
   an ODU receiving and matching unit which receives signals from an OTH network;
   a Generic Frame Procedure (GFP) receiving and matching unit which matches GFP-F frames output from the ODU receiving and matching unit with the Ethernet frames;
   an address lookup and demultiplexing unit which compares a destination address of the Ethernet frame with the source address recorded in the memory, and outputs demultiplexed Ethernet frames in response to the port information; and
   a plurality of Gigabit Media Independent Interface (GMII) sending unit which converts each of the Ethernet frames output from the address lookup and demultiplexing unit to a GMII format and outputs the GMII data.

9. The apparatus of claim 8, comprising three GMII sending units wherein the ODU receiving and matching unit corresponds to 2.5 giga rate ODU1 layer.

10. The apparatus of claim 8, comprising ten GMII sending units wherein the ODU receiving and matching unit corresponds to 10 giga rate ODU2 layer.

11. The apparatus of claim 8, comprising forty GMII sending units wherein the ODU receiving and matching unit corresponds to 40 giga rate ODU3 layer.

12. The apparatus of claim 8, wherein the memory is an FDB memory.

13. The apparatus of claim 8, wherein the address lookup and demultiplexing unit broadcasts the Ethernet frames if a destination address of the Ethernet frame and a source address recorded in the FDB memory are not the same.

* * * * *